INVENTOR.
LAURIE J. RAUTIO

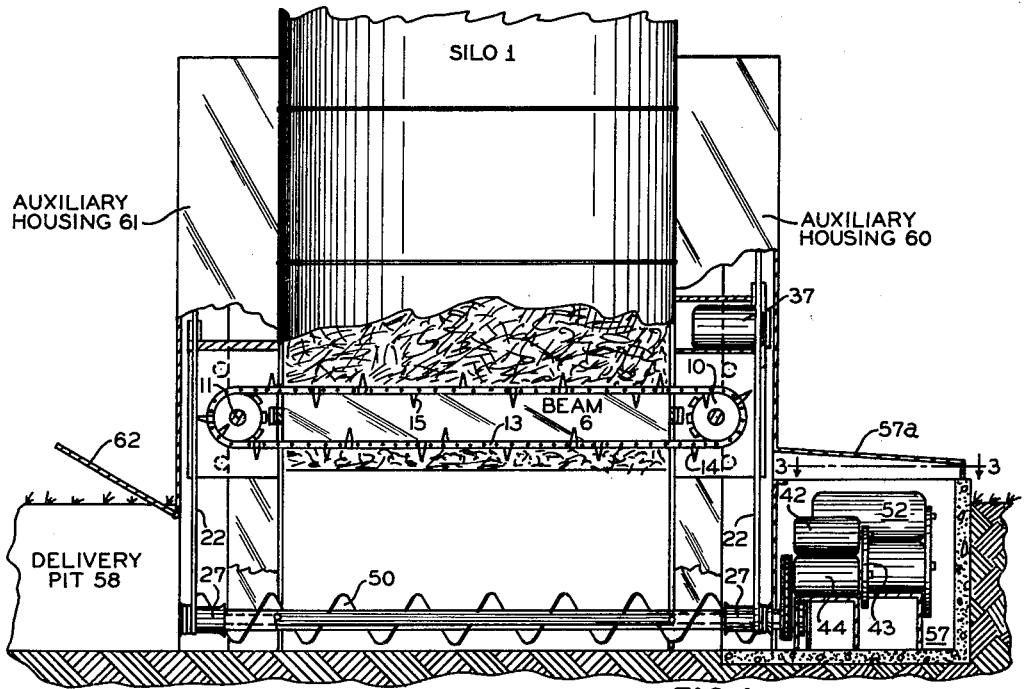

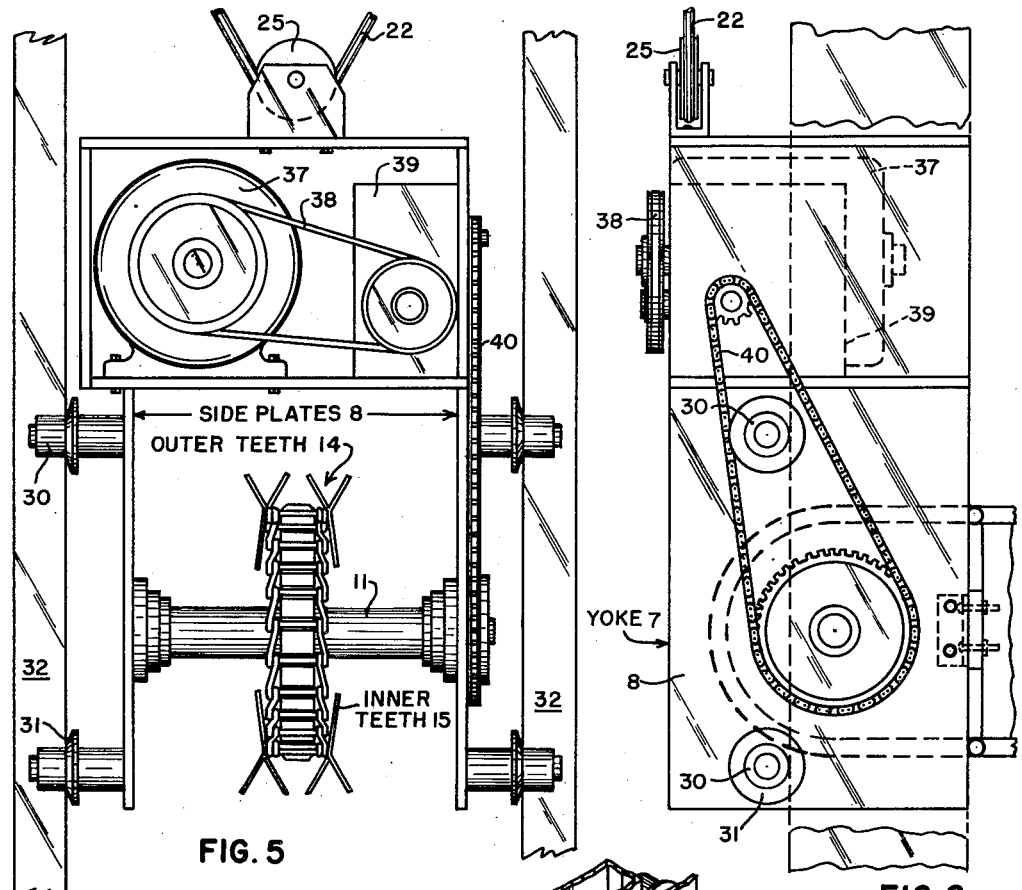
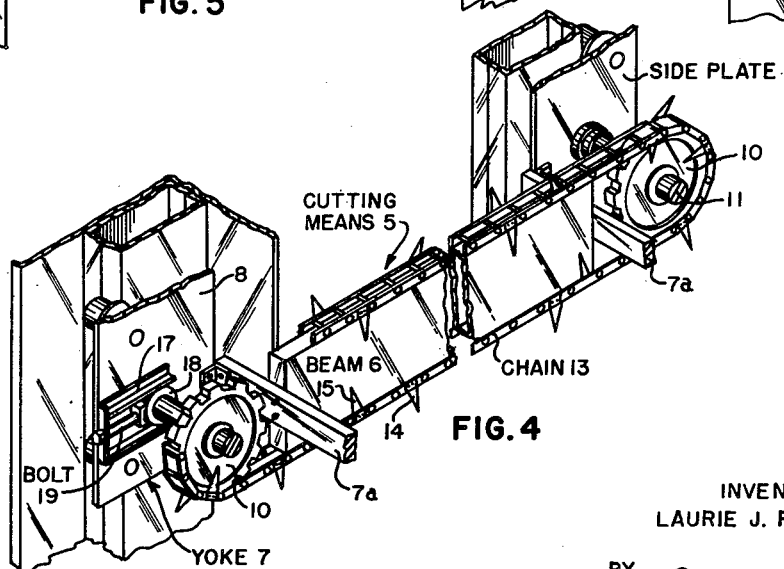

BY Arthur H. Robert

ATTORNEY

United States Patent Office 3,043,453
Patented July 10, 1962

3,043,453
METHOD OF AND APPARATUS FOR BOTTOM-UNLOADING FEED-STORING STRUCTURES
Laurie J. Rautio, Louisville, Ky., assignor to Clayton & Lambert Manufacturing Company, Louisville, Ky., a corporation of Delaware
Filed Aug. 21, 1958, Ser. No. 756,484
22 Claims. (Cl. 214—17)

This invention relates to a method of unloading material from the bottom of a silo and to an apparatus for practicing the method.

It has heretofore been proposed to unload ensilage from the bottom of a silo by horizontally rotating an elongate endless chain type of cutter-conveyor about a vertical axis in the bottom of the silo so as to undercut the bottom face of the stored column of material and simultaneously convey the cut material into an adjacent discharge conveyor which carries it outside of the silo. But this unloader operates under many difficulties. Among these, are: (1) it cuts primarily on its forwardly moving face and this cutting operation necessarily proceeds against the most tightly packed material in the entire column throughout the entire 360° swing of the cutting mechanism; (2) its top face is subject to the full weight of the column throughout its 360° swing and this weight may become effective at any point to jam the cutter downwardly with a force sufficient to stall it; (3) when it succeeds in effecting the removal of silage material throughout its full sweep, that material will, at times, tend to "bridge over" sufficiently to remain out of reach of the cutter until the bridge is broken; and (4) the removal of this device from the silo for maintenance and other purposes is difficult particularly when it is jammed under the weight of the column.

The principal objects of the present invention are: to eliminate, or lessen to a substantial degree, all of the foregoing objectives and difficulties; and to provide a bottom unloader which cuts primarily on its upper face, which seldom is required to cut against the most tightly packed material in the column, which seldom bears the full weight of the column, which seldom bears enough weight of the column to be jammed by it, which prevents the material from bridging over out of its reach and which may be readily removed for maintenance purposes.

Another important object is to provide a bottom unloading arrangement wherein the full weight of the stored column is supported on the floor of the silo for the most part and a component of that weight is used to feed silage material into the path of the cutter.

Another important object is to provide a simply and sturdily constructed bottom unloader which is relatively inexpensive to manufacture, easy to install and operate, reliable in operation, readily maintained in good repair and the repair of which is facilitated by the use of an unloader construction primarily composed of standard, interchangeable and readily available parts.

In accordance with my invention, silage is unloaded from the bottom of a silo by using a horizontally elongate endless horizontal chain type of cutter-conveyor to cut a deep inverted groove horizontally across the lower end of the stored column of silage and thereby divide the lower end portion of the column into at least two forks, one on each side of the groove and by conveying the cut material from the silo. In carrying out the invention, the horizontally elongate cutter is mounted so that it may be bodily moved vertically between a lower position in which it extends transversely across the bottom face of the stored column and an upper position in which it extends transversely through the lower end portion of the stored column at an elevation substantially above the bottom face thereof. With this arrangement, the unloader cuts primarily on its upper face. It is seldom required to cut against the most tightly packed material in the column because, when it first cuts upwardly into the column, it forms a groove therein and thereafter, for the most part, cuts material from the sides of this groove thereby avoiding the load imposed at the bottom of the silo by the full weight and density of the column upon horizontal cutters. As a consequence, the cutter is not likely to be subject to enough weight of the column to be jammed by it. The cutter also prevents the material from bridging over out of reach simply by cutting high enough to prevent the formation of a stable bridge or arch.

Preferably the silo bottom is provided with a horizontal upwardly open trough, the lower half of which accommodates a discharge conveyor and the upper half of which accommodates the horizontal cutter in its lowermost position. In this way, only the upper cutting face of the cutter is likely to be subjected to the full weight of the column and such condition is not apt to occur at any time except when a groove is first being cut into the bottom face of the column. Preferably also, means is provided to feed silage from the forks of the column on opposite sides of the groove to move into the path of the cutter after a groove has been cut. To this end, the floor of the silo, on opposite sides of the trough, is sloped downwardly toward the trough at an angle steep enough to render a component of the weight of the column effective in urging material from the forks of the column toward the path of the cutter after the groove has been cut. While the floor is sloped, substantially the full weight of the stored material is necessarily supported thereon.

Preferably the side walls of the silo are slotted vertically in alignment with the trough over a distance sufficient to accommodate the vertical movement of the cutter and the ends of the cutter are extended to project outwardly through these slots. This is done to facilitate the location of the cutter mounting and drive means outside of the silo proper and to enable the cutter to convey cut material to a location (preferbaly outside of the silo proper) where it can be conveniently directed into the discharge conveyor. Naturally all of the bottom space within the silo proper and so much of the space outside of the silo proper, which is required to accommodate the ends of the cutter and the associated cutter mounting and drive means, is sealed to prevent the access of atmospheric air to the bottom of the column except through the outlet opening of the discharge conveyor which can be readily controlled to limit the entry of air to a point where significant spoilage is not apt to occur.

The invention is illustrated in the accompanying drawings wherein:

FIG. 1 is a side elevation of the lower end of a silo with the bottom part broken away almost to the center of a silo to show the unloader mechanism partly in elevation and partly in section;

FIG. 2 is an elevational view taken from the left side of FIG. 1 and having portions cut-away to illustrate the unloader details;

FIG. 3 is a sectional view taken on lines 3—3 of FIG. 1;

FIG. 4 is a fragmentary perspective view of the cutter which forms a part of the unloading mechanism;

FIG. 5 is an elevational view showing the "right" end of the cutter as it appears in FIG. 1 and a carriage-trackway connection between the cutter and the silo;

FIG. 6 is an elevational view of the right side of the mechanism shown in FIG. 5;

Figure 7:
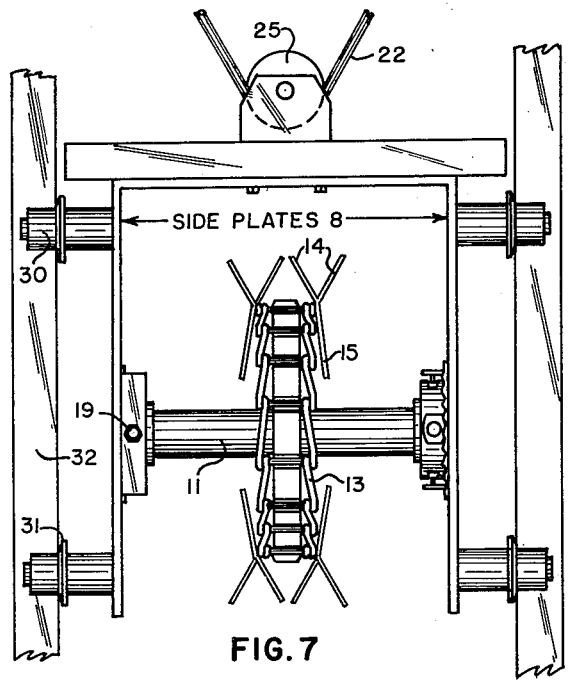
FIG. 7 is an elevational view showing the "left" end of the cutter as it appears in FIG. 1 and the corresponding carriage-trackway connection.
Figure 8:
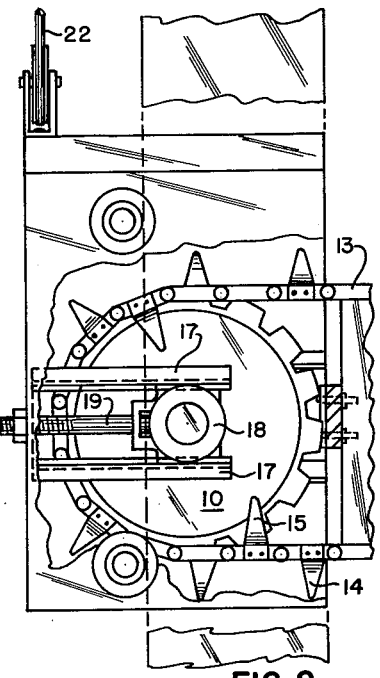
FIG. 8 is an elevational view of the right side of the mechanism shown in FIG. 7 with portions cut-away.

A bottom-unloading feed-storing apparatus constructed in accordance with the present invention is illustrated in the drawing. This installation comprises: a silo; silage cutting means; cutter mounting means; cutter chain actuating means; cutter hoist drive means; silage side feed means; a silage discharge conveyor; conveyor drive means; and auxiliary housing means.

SILO

A silo 1 conventionally includes a concrete footing or base 2 anchored in the ground and a series of cylindrical sheet metal sections 3 superposed one upon the other to form the characteristic tower of the conventional silo. Normally, in filling this silo, the ensilage is chopped up and blown into the silo through an opening in its roof.

SILAGE CUTTING MEANS

The silage cutting means 5 is in the form of a horizontally elongate endless chain-type of cutter-conveyor. It may be viewed as a conventional chain saw which, however, is modified not only to cut also to convey silage. The cutting means illustrated includes: a frame; sprockets, an endless chain; and chain tensioning means.

Frame

The frame is in the form of a horizontally elongate rigid beam 6 preferably long enough to span the entire diameter of the silo and terminating in an outwardly open U-shaped yoke structure generally designated by the numeral 7, this structure including a horizontal bight bar 7a, the center of which is secured to the adjacent end of the beam 6 and a pair of vertically arranged side plates 8 which are rigidly secured to the outer ends of the bight bar 7a.

Sprockets

Each yoke 7 horizontally straddles a vertically-arranged sprocket 10 which is mounted thereon through a horizontal shaft 11. Each sprocket has a root diameter substantially equalling the height of the beam so that the runs of the chain will hug the upper and lower surfaces of the beam.

Endless Chain

The endless cutter chain 13 is mounted on the sprockets 10 to extend endlessly around the beam 6 and within a vertical plane so that its upper run passes over the beam and its lower run under the beam. This chain 13 conventionally comprises an endless series of pivoted links 13a. For cutting and conveying purposes, it is additionally provided, at suitably spaced intervals along its length, with cutter-conveyor teeth comprising outer teeth 14 and inner teeth 15, each tooth being rigidly secured to an adjacent link at one vertical side or the other of the chain proper. All of the outer teeth 14 project outwardly from the orbit of the chain and are set at various angles to the vertical, some being canted outwardly away from the major vertical plane passing centrally through the chain and others being canted inwardly toward that plane. The inner teeth 15 project inwardly in the general direction of the area encompassed by the orbit of the chain. They are positioned to travel alongside the vertical faces of the upper and lower margins of the beam 6 and function as an aid in tracking the chain 13 on the beam and in cutting away the silage that tends to press against these margins of the beam.

Chain Tensioning Means

To adjust the tension on the cutting chain 13, one of its sprockets 10 is adjustably mounted on both side plates 8 of its yoke 7, for adjusting movement toward and away from the other sprocket 10. To this end, each side plate 8 carries: a pair of upper and lower horizontal guide tracks 17; a bearing block 18 positioned therebetween and slidably connected thereto; and an adjusting bolt 19 interconnecting the bearing block 18 with the adjacent side plate 8 in a manner such as to move the bearing block 18 horizontally between and along the guide tracks 17 in one direction or the other depending upon the direction in which the bolt 19 is turned. It will be understood that opposed bearing blocks 18 receive opposite ends of the shaft 11 for the adjacent sprocket 10; consequently, when these blocks are moved in one direction or the other, the chain tension will be correspondingly increased or decreased.

CUTTER MOUNTING MEANS

The cutter is mounted for vertical movement between a lower position, in which it extends transversely across the bottom end face of a stored column of material to an upper position substantially above its lower position. While this may be readily done in any of various ways, as by mounting it on one or more vertically movable hydraulic pistons or on suitable extensible-retractable linkages, it is preferably done by slotting the side walls of the silo vertically over a distance sufficient to accommodate the vertical movement of the cutter, extending the length of the cutter horizontally so that its ends project outwardly through said slots sufficiently to locate its sprockets entirely outside of the silo proper and suspending each outwardly projecting end of the cutter upon a hoist cable by which it may be raised or lowered throughout its full range of vertical movement.

Accordingly, the housing is provided with diametrically opposed vertical slots 21 and each projecting end of the cutter is supported upon a separate hoisting cable 22. Any hoisting cable arrangement may be used, the one shown including, at each end of the cutter, a 3-point suspension wherein a cable 22 extends from a fixed terminal anchorage connection 24 above the upper limit of cutter movement downwardly around a pulley 25, which is mounted on the yoke of the adjacent end of the cutter, and thence upwardly around a pulley 26 which is also mounted on the silo above the upper limit of cutter movement. From pulley 26, the cable 22 is directed downwardly and wrapped around a winch 27 which is fixedly mounted on a rotatable shaft 28 mounted in the base of the silo. Preferably both winches 27 are mounted on the same shaft 28. Obviously, when this shaft is turned in a direction such as to wind both cables 22 about their respective winches, the cutting means will be positively elevated. As these winches are unwound, the weight of the cutting means will cause it to be lowered. However, it may be pulled downwardly by cables (not shown) and thus lowered in a positive manner where desired.

A carriage-trackway connection is provided between each end of the cutter and the silo in order to guide the cutter during its vertical movement. To this end, the outer face of each side plate 8 of each yoke 7 is provided with a pair of upper and lower guide rollers 30 having flanges 31 which bear upon upright tracks 32 in the form of beams rigidly mounted on the silo.

In order to minimize the possibility of the cutter being jammed by the weight of the stored material, the floor of the silo is provided with a horizontal trough 35 which vertically is aligned with the cutter and arranged to house the cutter in its lower position and thereby protect all faces thereof from contact with the stored material except the upper cutting face.

CUTTER CHAIN ACTUATING MEANS

The endless chain 13 is actuated by drive means preferably located at that end of the cutter which is opposite to the end having the chain tensioning means. This drive comprises: an electric motor 37 which is mounted on the yoke 7; and a suitable driving connection extending therefrom to the shaft 11 of the adjacent sprocket 10, the connection shown including a belt 38 interconnecting the motor pulley with a reduction gear 39 and a belt 40 interconnecting the reduction gear 39 with a suitable gear on the outer end of the shaft 11.

CUTTER HOIST DRIVE MEANS

The winch shaft 28 is rotated in one direction or the other by an electric motor 42 which may be connected to the shaft 28 by any suitable drive connection, the one shown including a belt 43 connecting the motor 42 to a gear reducer 44 and a chain 45 connecting the gear reducer 44 to a suitable gear on the winch shaft 28. As will be apparent, the rotation of the hoist motor 42 in one direction and the other will wind and unwind the winches to elevate and lower the cutter.

SILAGE SIDE FEED MEANS

When the cutter is operated to kerf a groove in the lower end of the stored column, and thus fork that lower end portion, it is desirable to feed stored material from these forks into the path of the cutter in order to insure the presence of feed material in the path of the cutter at all times. To accomplish this, any form of side feeding means suitable for this purpose may be used.

The simplest means, which I have found to be very effective, is to slope the floor of the silo at an angle steep enough to render a component of the weight of the stored material effective in moving the forks of the stored material toward the trough 35. Accordingly, the floor of the silo is sloped, from each lip of the trough 35, upwardly and outwardly at a suitable angle ranging between 30 and 60°. A 45° angle is preferred, but, in this connection, the slope of the angle should be minimized to minimize the loss of storage space. The sloped floor may be composed of any suitable material such as metal or concrete, the floor illustrated being composed of a pair of heavy metal plates, each of which is cut along its upper edge to conform to the curvature of the side walls at the chosen angle.

SILAGE DISCHARGE CONVEYOR

During the cutting operation, some of the cut material will simply drop downwardly into the trough 35 while some will be carried by the lower run of the cutter chain 13 and discharged from that end of the cutter, toward which the lower run of the chain moves, where it is free to fall downwardly. But most of the cut material will be carried or dragged by the upper run of the cutter chain and discharged at the opposite end of the cutter where it also is free to fall downwardly. While any suitable form of means may be arranged to receive the fallen material and remove it from the silo, I prefer the use of a horizontally elongate upwardly open spiral screw conveyor composed of a trough-like housing 49 and spiral screw 50. The silo trough 35 is made deep enough to house this feed discharge conveyor underneath the cutting means when the latter is in its lower or lowest position. This discharge conveyor extends the full diameter of the silo and projects outwardly through downward extensions of the silo slots 21 to project outwardly beyond the side walls of the silo to the extent necessary to catch feed material dropping from any part of the cutter chain throughout its length.

SCREW CONVEYOR DRIVE MEANS

The spiral screw 50 of the discharge conveyor is driven by an electric motor 52 through any suitable drive connection, the one shown including a belt 53 interconnecting the motor 52 with a reduction gear 54 and a chain 55 interconnecting the reduction gear 54 with a suitable gear at one end of the spiral screw 50. The discharge conveyor is driven at one end in a direction such as to move the silage material received by it toward its opposite or discharge end.

AUXILIARY HOUSING MEANS

The drives for the cutter elevator winches and for the discharge conveyor are housed in an upwardly open motor pit 57. An upwardly open delivery pit 58 is located at the discharge end of the discharge conveyor.

With bottom unloaders, it is necessary to seal the silo sufficiently to prevent the outside atmosphere from having access to the lower end of the stored column of material for otherwise the oxygen of that atmosphere will promote the molding and spoiling of the material at the lower end of the column and this condition will extend upwardly into the column in accordance with the degree of oxygen penetration. In the present case, therefore, it is necessary to provide auxiliary housings over the outer side of each housing slot 21 and to make these housings large enough to enclose the outer or auxiliary space required for the projecting ends of the cutter and discharge conveyors, the cutter hoisting mechanism and the feed material falling from the outer ends of the cutter.

Accordingly, a pair of vertically elongate auxiliary housings 60 and 61 are provided, one over each slot 21. The housing 60 encloses the auxiliary space above the top level of the motor pit 57 and cooperates with the motor pit, and with a top cover 57a on it, to enclose the auxiliary space below the top level of said pit. On the other side, the housing 61, which has its lower end interposed between the delivery pit 58 and the silo, encloses all of the auxiliary space including the outlet of the discharge conveyor. However, to permit the discharge of silage from the discharge conveyor into the delivery pit 58, the auxiliary housing 61 is provided with a hinged cover 62 which is normally closed over the discharge opening of the discharge conveyor.

OPERATION

Before loading the silo, the cutter is lowered into its lower position within the upper half of the bottom trough 35. Thereafter the mouth of trough 35 and the side wall slots 21 are covered to keep the ensilage from flowing downwardly into the trough or outwardly through the slots during the silo loading operation. Once the silo is filled, the stored material will pack so tightly, as to eliminate any appreciable tendency to flow through the side wall slots or to drop into the bottom trough. The covering over the mouth of the bottom trough also protects the cutter itself from the full weight of the stored column.

Before, during or shortly after the loading operation, the lower end of the silo should be sealed; hence, the top opening of motor pit 57 is closed by cover 57a and the horizontal outlet of the discharge conveyor is closed by hinged cover 62 of auxiliary housing 61. So long as silage is not to be removed, the silo should remain sealed.

Figure 10:
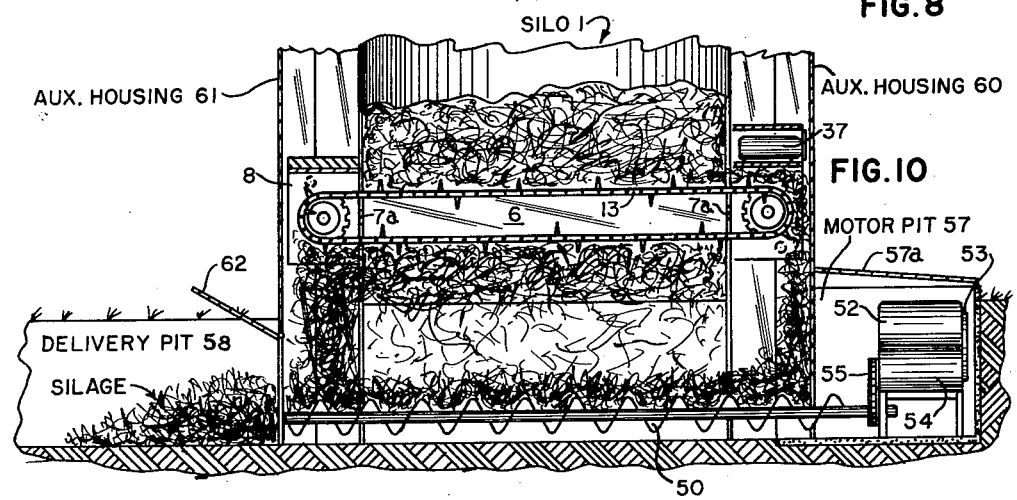
FIG. 10 is a vertical section similar to FIG. 1 illustrating the unloading mechanism in operation.
Figure 9:
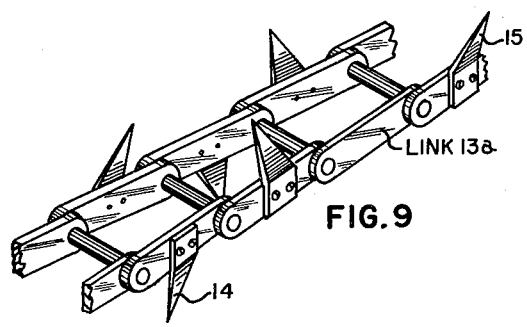
FIG. 9 is an enlarged fragmentary perspective view of the cutter chain.

The filled silo is conditioned or made ready for the unloading operation as follows: (a) the coverings from the mouth of the bottom trough and from the side wall slots 21 are removed if that has not already been done; (b) the discharge conveyor is energized and the discharge outlet cover 62 opened; and (c) actuating the cutter chain 13 preferably in a direction such that its upper run will direct the main flow of cut material into the discharge end portion of the discharge conveyor or, in other words, direct it to the left in FIG. 10. Before filling the silo, the side wall slots 21 and the mouth of trough 35 may be covered by pads of hay or by a charge of hay partially filling the silo to the requisite depth. When this is done, it becomes unnecessary to remove such covering except as a part of the silage. To institute unloading, the hoist is operated to raise the cutter and thereby bring its moving cutter-conveyor chain into engagement with the bottom end face of the stored column. Here it will engage the most tightly packed material in the entire column and proceed to cut the horizontally elongate inverted groove into the column.

As the cutter is progressively raised, the inverted groove is progressively heightened. When a certain fraction (say ½) of the total silage to be unloaded during this particular operation has been cut, conveyed and thereby unloaded, the vertical movement of the cutter may be reversed to cut additional material as the cutter moves downwardly toward its lower position. If enough material is not unloaded in one vertically upward and downward movement of the cutter, the foregoing operation may be repeated one or more times and extended vertically higher, if necessary. Ultimately, during this or succeeding unloading operations, a horizontal inverted groove is cut into the column to a depth corresponding to the full vertical movement of the cutter.

The horizontally elongate inverted groove thus cut in the lower end portion of the column has the effect of "forking" the lower end of the stored column. With a groove of appropriate height, a component of the weight of the stored material becomes effective to force these forks obliquely downward and thus move them relatively toward each other and thereby feed additional material into the path of the cutter. When the height of the groove is sufficient to produce this side feeding action, it becomes impossible for the material to form a stable arc around or bridge over the path of the cutter and remain out of its reach. Normally, with the floor plates at a 45° angle, the groove will be deep enough when it reaches a level corresponding to or slightly above the uppermost portion of the sloped floor.

The side feeding movement required to effect a partial or complete closure of the groove seldom proceeds suddenly or rapidly. On the contrary, it usually proceeds at a rate proportioned to the height and width of the inverted groove. In other words, with an unstable bridge, the higher or wider the groove, the faster the downward feed. Sometimes, it proceeds slowly, occurring overnight. However, because of this side feeding movement, it is desirable, at the end of each unloading operation to return the cutter to its lower position within the bottom trough and thereby protect it against being jammed between the two forks of the stored material.

In operating the cutter in this way, it will be appreciated that about the only time the cutter must work against the full density of the column is when it initially starts to form the groove in the bottom end face thereof. But even then the side faces of the cutter do not bear any weight. Furthermore, its cutting face does not bear the full weight of the column because the cutter need only be pressed upwardly against the column with a controlled and controllable force sufficient to cut feed material therefrom.

Once the groove is formed, the cutter usually does nothing more than cut or shave feed material from the sides of the forks of the column except in the extreme upper portion of its vertical movement. Here, after an unloading operation has been completed, the entire column will settle downwardly during the next, say 12 hours. This downward movement will, as a rule, lower the inverted bottom of the groove from 1 to 3, 4 or 5 inches. Again, however, in digging into this inverted bottom, the upper cutting face of the cutter will normally be pressed upwardly against the inverted bottom of the groove with a controllable force sufficient to cut material therefrom.

During the upward movement of the cutter, the upper run of the chain may be moved in either direction. If it conveys to the motor pit side of the silo, then the discharge conveyor must convey it all the way from the motor pit side back to the delivery pit side. On the other hand, if it conveys to the delivery pit side, the material falls into the delivery end portion of the discharge conveyor; hence, is conveyed thereby for a short distance only before it is discharged into the delivery pit 58. Consequently, the cutter is preferably designed for movement toward the delivery pit side of the silo.

Because of this, it may be desirable to reverse the direction of movement of the chain 13 coincident with each reversal of the vertical movement of the cutter as a whole. In this way, the lower run of the chain can be made, during downward travel, to deliver cut material to the delivery side of the silo. Naturally, other controls may be conventionally applied to this arrangement such as controls to effect the vertical movement automatically at a predetermined rate and to slow down such movement, stop it or even reverse it when the load exceeds a predetermined value.

It will be appreciated that this particular bottom unloading silo achieves the objects stated and that it is relatively easy to seal. Inasmuch as the cutter is housed in the trough 35, it obviously is readily removable for repair and replacement purposes while the remaining parts are readily accessible for such purposes. Consequently, this arrangement lends itself to the storing of wet or green ensilage, ear corn and like materials in silos and like structures and to the unloading of such materials from the bottom of such structures.

Having described my invention, I claim:

1. A method of unloading ensilage, ear corn and like materials from the bottom of a column of such material stored in silos and like structures, comprising: cutting an inverted transversely-extending groove across the bottom end portion of said column and progressively deepening that groove to a predetermined height intermediate the bottom and top of said column; and removing the cut material from said groove.

2. The method of claim 1 including: performing the cutting operation to cut entirely across the columns so as to fork the lower end portion thereof.

3. The method of claim 2 including: urging the forks of said column on the opposite sides of said groove inwardly to move the material into said groove and fill it; and repeating the cutting of said groove.

4. A bottom-unloading feed-storing apparatus for storing a column-forming mass of ensilage, ear corn or like material and for unloading that material from the bottom of the stored column, comprising:
   (a) a silo-type structure;
   (b) means operatively associated with that structure to kerf the lower end of a stored column in that structure by cutting a horizontal inverted-groove transversely across the bottom face of said column and progressively deepening said groove within limits extending up to a predetermined height intermediate the top and bottom of said column,
   (1) said means including cutting means and means mounting the cutting means for horizontal groove-cutting movement and for vertical groove-deepening movement,
   (2) said cutting means being operative, when actuated, to move in a horizontal groove-cutting direction and, when progressively moved upward, to heighten said groove progressively; and
   (c) means for removing cutting material from said groove.

5. The apparatus of claim 4 wherein: said cutting means forks the lower end portion of a stored column by cutting said groove substantially entirely across the bottom face thereof.

6. The apparatus of claim 4 including: said mounting means being arranged to mount the cutting means for vertical movement bodily between a lower position, in which it extends transversely across the bottom end face of the stored column, to an upper position substantially above its lower position; drive means for actuating said cutting means; and elevator means for moving said cutting means bodily between upper and lower positions.

7. The apparatus of claim 6 wherein: said cutting means forks the lower end portion of a stored column by transversely cutting said groove substantially entirely through said lower end portion.

8. The apparatus of claim 7 including: side feed means urging material from said forks into said groove, 9. The apparatus of claim 8 wherein: said side feed means includes a floor which supports the lower end of said stored column and which slopes downwardly under said column to a position corresponding to one lower side edge of said groove.

10. The apparatus of claim 6 wherein: said silo-type structure has the lower end portion of its storage-space-defining side walls fashioned with a vertically extending slot; and said cutting means delivers cut material from said groove through said slot.

11. The apparatus of claim 10 including: housing means mounted on said silo-type structure to extend over the outer side of said slot and to form a conduit which constrains said delivered cut material to flow downwardly into the removing means.

12. The apparatus of claim 11 wherein: said cutting means projects through said slot into said conduit.

13. The apparatus of claim 4 wherein: said silo-type structure includes a floor for supporting the lower end of a stored column, said floor having a transverse trough therein which is vertically aligned with that portion of the silo storage space corresponding to a groove formed by the cutting means, said floor sloping downwardly under said column to one edge of said trough; and said structure has the lower portion of its storage-space-defining side walls fashioned with a pair of oppositely-disposed vertical slots which are aligned with each other and with that portion of the silo storage space corresponding to a vertical groove formed by the cutting means.

14. The apparatus of claim 13 wherein: said cutting means is in the form of a horizontally elongate endless chain-type of cutter-conveyor; and said mounting means mounts said cutter-conveyor for vertical movement bodily between a lower position in which it extends transversely across the lower end portion of said structure along the mouth of said trough, to an upper position in which it extends transversely through the lower end portion of a stored column at an elevation substantially above its lower position.

15. The apparatus of claim 14 wherein: the side wall slots of said structure extend vertically over a distance sufficient to accommodate the vertical movement of said cutter-conveyor; and said cutter-conveyor is operative to deliver cut material through at least one of said slots.

16. The apparatus of claim 15 wherein: the opposite ends of said cutter-conveyor project through said oppositely-disposed slots.

17. The apparatus of claim 16 including: drive means for actuating said cutter-conveyor; and elevator means for moving said cutter-conveyor vertically.

18. The apparatus of claim 17 wherein: said actuating drive means includes a motor mounted on a projecting end of said cutter-conveyor.

19. The apparatus of claim 18 wherein: said elevator means includes winch means outside of said silo structure; cable means connecting said winch means to each projecting end of the cutting means; and a motor for operating said winch means.

20. The structure of claim 19 wherein: said removing means includes a screw conveyor in the bottom of said trough.

21. The apparatus of claim 20 including: housing means mounted on said silo structure over the outer side of each slot to form a vertical conduit at least one of which receives cut material from the adjacent slot and directs that material to the removing means.

22. The apparatus of claim 21 wherein: said housing means cooperates with said silo structure to enclose the auxiliary space extending between the slots of the silo and the removing means, and seal it against communication with the outside atmosphere except through the outlet of said removing means.

References Cited in the file of this patent

UNITED STATES PATENTS

| | | |
|---|---|---|
| 812,230 | Raymond | Feb. 13, 1906 |
| 1,070,296 | Shepanek | Aug. 12, 1913 |
| 1,193,494 | Crocker | Aug. 1, 1916 |
| 1,971,716 | Hitchcock | Aug. 28, 1934 |
| 2,529,583 | Adams | Nov. 14, 1950 |
| 2,571,277 | Morrow | Aug. 16, 1951 |
| 2,613,832 | Ogorzaly | Oct. 14, 1952 |
| 2,626,068 | Bradshaw | Jan. 20, 1953 |
| 2,701,653 | Gilson | Feb. 8, 1955 |